(12) United States Patent
Schommer et al.

(10) Patent No.: US 7,877,883 B2
(45) Date of Patent: Feb. 1, 2011

(54) METHOD FOR LOCATING A GEOMETRIC DETAIL FOR DETERMINING THE SPATIAL POSITION OF A WHEEL RIM RELATIVE TO A MEASURING INSTRUMENT AND METHOD AND DEVICE FOR DETERMINING THE SPATIAL POSITION OF A WHEEL RIM WITH RESPECT TO A MEASURING INSTRUMENT

(75) Inventors: Stefan Schommer, Unterschleissheim (DE); Hermann Bux, Adelzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 12/304,165

(22) PCT Filed: Aug. 27, 2007

(86) PCT No.: PCT/EP2007/058853

§ 371 (c)(1),
(2), (4) Date: Jul. 24, 2009

(87) PCT Pub. No.: WO2008/028831

PCT Pub. Date: Mar. 13, 2008

(65) Prior Publication Data

US 2010/0037473 A1 Feb. 18, 2010

(30) Foreign Application Priority Data

Sep. 8, 2006 (DE) .................. 10 2006 042 308

(51) Int. Cl.
*G01B 11/27* (2006.01)
*G01B 11/275* (2006.01)

(52) U.S. Cl. .......................... 33/203; 33/288

(58) Field of Classification Search ............ 33/203, 33/203.18, 288

See application file for complete search history.

(56) References Cited

U.S. PATENT DOCUMENTS

| | | | |
|---|---|---|---|
| 5,488,472 A * | 1/1996 | January | 33/288 |
| 6,323,776 B1 | 11/2001 | Jackson et al. | |
| 6,526,665 B2 * | 3/2003 | Jackson | 33/203.18 |
| 6,842,238 B2 * | 1/2005 | Corghi | 33/203.18 |

(Continued)

FOREIGN PATENT DOCUMENTS

DE 10 2004 013 441 10/2005

(Continued)

OTHER PUBLICATIONS

International Search Report, PCT/EP2007/058853 dated Jan. 21, 2008.

*Primary Examiner*—G. Bradley Bennett
(74) *Attorney, Agent, or Firm*—Kenyon & Kenyon LLP

(57) ABSTRACT

A method for locating a geometric detail of at least one wheel rim for determining its spatial position relative to a measuring instrument, includes: aiming at least one measuring camera of a measuring instrument of a chassis measuring system at a wheel rim; recording an image of a wheel rim using the at least one measuring camera; ascertaining at least one geometric detail in the image of the wheel rim; and selecting a known geometric detail for determining the spatial position of the wheel rim relative to the measuring instrument.

23 Claims, 9 Drawing Sheets

U.S. PATENT DOCUMENTS

| | | | |
|---|---|---|---|
| 7,458,165 B2 * | 12/2008 | Rogers | 33/203.18 |
| 2002/0189115 A1 * | 12/2002 | Jackson et al. | 33/286 |
| 2003/0055535 A1 * | 3/2003 | Voeller et al. | 33/286 |
| 2004/0128844 A1 * | 7/2004 | Robb et al. | 33/203.18 |
| 2006/0274303 A1 * | 12/2006 | Jackson et al. | 33/203.18 |
| 2007/0283582 A1 | 12/2007 | Donner et al. | |
| 2008/0086900 A1 * | 4/2008 | Rogers | 33/288 |
| 2008/0289202 A1 * | 11/2008 | Kassouf et al. | 33/288 |
| 2010/0149526 A1 * | 6/2010 | Rogers et al. | 33/288 |

FOREIGN PATENT DOCUMENTS

| | | |
|---|---|---|
| EP | 0 895 056 | 2/1999 |
| WO | WO 2006/074026 | 7/2006 |

* cited by examiner

METHOD FOR LOCATING A GEOMETRIC DETAIL FOR DETERMINING THE SPATIAL POSITION OF A WHEEL RIM RELATIVE TO A MEASURING INSTRUMENT AND METHOD AND DEVICE FOR DETERMINING THE SPATIAL POSITION OF A WHEEL RIM WITH RESPECT TO A MEASURING INSTRUMENT

FIELD OF THE INVENTION

The present invention relates to a method for locating a geometric detail for determining the spatial position of a wheel rim relative to a measuring instrument, a measurement method and a measuring instrument for determining the spatial position of a wheel rim as well as a chassis measuring device with which such a method for locating a geometric detail for determining the spatial position of a wheel rim relative to a measuring instrument is used.

BACKGROUND INFORMATION

DE 10 2004 013 441 describes a measurement method and a measuring instrument for determining the spatial position of a wheel rim as well as a chassis measuring device. This measurement method is based on recognition of a geometric detail of a wheel rim, e.g., the rim flange, analyzing same with respect to its position in space and combining the results to yield an axial measurement.

It may happen that no geometric detail is recognized due to soiling of the wheel rim. In that case, the measurement method according to DE 10 2004 013 441 is not usable.

It may also happen that multiple geometric details on the wheel rim are recognized and that the method is performed based on a less suitable geometric detail of the wheel rim, thereby yielding suboptimal results.

SUMMARY

Example embodiments of the present invention provide a method and a device for locating a geometric detail and for determining the spatial position of a wheel rim which will allow an accurate axial measurement when problems occur during unambiguous recognition of the geometric details of a wheel rim.

Geometric details may be located with the method according to example embodiments of the present invention for determining their spatial position relative to a measuring instrument.

The geometric detail is usually a circular or ellipsoidal toroidal or point-shaped or dash-shaped element of the wheel rim. However, the geometric detail need not be part of the wheel rim but instead may also be a target attached to the wheel rim or to the wheel hub or an object attached to the wheel rim or the wheel hub, e.g., an ornamental hub cap or the like or a steel disk or the like, such as those attached to the wheel hub as a measuring wheel in motor sport. When speaking of a geometric detail of a wheel rim in the following description, this is understood to include geometric details on the wheel rim itself as well as targets or objects attached to the wheel rim or the wheel hub.

In the method according to example embodiments of the present invention, initially at least one measuring camera of a measuring instrument of a chassis measuring device or of an automotive test track is aimed at a wheel rim and an image of the wheel rim is detected. At least one, preferably several geometric details in the image of the wheel rim are then ascertained, so that for determining the spatial position of the wheel rim relative to the measuring instrument, it is not unambiguous which geometric detail is most suitable for that.

Wheel rims of a motor vehicle wheel often have more than one geometric detail usable for the measurement method. Therefore, in the next method step, one of the recognized geometric details is selected for determining the spatial position of the wheel rim relative to the measuring instrument.

Different decision criteria are available for this selection; for example, the wheel rim flange is preferred as the preferred geometric detail for the following measurement method if it has been ascertained on the image of the wheel rim. Alternatively, other evaluation criteria, for example the preference for toroidal geometric details in comparison with point-shaped or dash-shaped geometric details, the visibility or the contrast ratio of the geometric detail or the largest possible diameter in the case of toroidal geometric details may be used. Essentially, different geometric details of a wheel rim may be suitable for a subsequent method for determining the spatial position of a wheel rim relative to a measuring instrument.

According to an example embodiment of the method according to the present invention, two wheel rims are observed at the same time, namely by at least one measuring camera of a measuring instrument for each rim. The measuring cameras of the two measuring instruments are initially aimed at the two wheel rims, and then at least one image of the wheel rim is detected by each measuring camera.

According to an example embodiment of the present invention, the four wheel rims of a motor vehicle are each detected by one measuring instrument having at least one camera by aiming the measuring cameras of the measuring instruments at one wheel rim each and by the measuring cameras then detecting at least one image of each wheel rim.

Additional measuring instruments having measuring cameras for the wheel rims of the third axle and each additional axle may of course also be provided for triple-axle or multi-axle vehicles.

When multiple measuring instruments are used and multiple wheel rims are observed by the measuring cameras of these measuring instruments, at least one geometric detail in the image of a wheel rim may be ascertained and then an ascertained geometric detail may be selected for determining the spatial position of this wheel rim relative to the measuring instrument. This selected geometric detail may then be tested for whether it is also present in the measuring camera images of the other measuring instruments. If this is the case, this selected geometric detail is suitable for determining the spatial position of the wheel rims relative to the measuring instruments. If this is not the case, an attempt may be made to locate this geometric detail in the other wheel rim images, or if this is impossible, another geometric detail may be selected. In a variant, a transfer of the optimum geometric detail for all wheel rims of the motor vehicle on this test stand may be checked and performed automatically.

According to an example embodiment of the present invention, the geometric details of the wheel rims may be filtered so that only those which occur in all images of the wheel rims are ascertained and made available for a selection, and the optimum geometric detail is ultimately selected from these pre-filtered geometric details. This filter function may result in a common geometric detail of all wheel rims being located and defined unambiguously as the best according to the evaluation criteria so that no further selection is necessary.

In a variant of the method according to example embodiments of the present invention for locating a geometric detail for determining the spatial position of a wheel rim relative to a measuring instrument, at least one measuring camera of the measuring instrument is first aimed at a wheel rim, and an image of this wheel rim is detected. A partial area in the detected image of the wheel rim is then selected; this takes place in particular when no geometric detail is recognizable in the detected image, e.g., due to damage or soiling of the wheel rim or due to optical restrictions and/or shadow distributions. A preselection is made by the selection of the partial area in the image of the wheel rim, and on this basis at least one geometric detail in the image of the wheel rim is recognizable for determining its spatial position relative to the measuring instrument.

This method according to example embodiments of the present invention ensures that a geometric detail which is necessary for the subsequent determination of the spatial position of the wheel rim relative to the measuring instrument is ascertained even when such a geometric detail is not initially discernible on the recorded image of the wheel rim. Through the selection of a partial area in the image of the wheel rim, important assistance is thus given to the chassis measuring device or the automotive test track without being able to determine the spatial position of the wheel rim relative to the measuring instrument.

According to this variant of the method, at least one point representing a screw, a borehole or a valve on the wheel rim, for example, is determined for the selection of a partial area in the image of the wheel rim.

Since toruses are fundamentally more suitable for the subsequent determination of the spatial position of the wheel rim relative to the measuring instrument, at least three points may be determined for the selection of a partial area in the image of the wheel rim, a circular or ellipsoidal toroidal geometric detail passing through these three points, which are on the circular geometric detail of the image shown.

It is particularly advantageous if these at least three certain points are equidistant, i.e., if they are spaced uniformly around the circumference of the geometric detail.

In example embodiments of the present invention, at least one rectangular area around a circular or ellipsoidal geometric detail is defined for selection of a partial area in the image of the wheel rim. In this way, assistance may be provided for locating a geometric detail to suitably restrict the area to be investigated.

The example embodiments of the present invention indicated below are based on both variants of the method.

If two stereo measuring cameras are aimed at a wheel rim at an angle, the obtained measurement results may be improved.

The image(s) of the wheel rim and/or the at least one ascertained geometric detail may be displayed on a display device, in particular on a screen, to give the user visual feedback and the option of interaction.

In an advantageous refinement of the method, the selection of an ascertained geometric detail and/or a partial area is user-controlled with the image of the wheel rim, namely via a display device, in particular via a screen and/or an input device, in particular a mouse or a keyboard. The geometric detail of the wheel rim is thus determined in a user-interactive manner. The user is able to make a selection via the display device and the input device in an interactive manner or may select a partial area. At least the image of one of the stereo cameras of a measuring head is displayed on the display device on which corresponding interactions may be performed with the help of the input device. For many application cases, the images of both stereo cameras of one measuring head must be displayed and processed interactively.

In a first method variant, the user selects one of several suitable geometric details of a wheel rim of a wheel made available by the measurement system from the image displayed. In the second method variant, the user selects an area in which the measurement system is to ascertain a geometric detail of a wheel rim.

As an alternative to user-interactive determination of the geometric detail of the wheel rim, an ascertained geometric detail and/or a partial area in the image of the wheel rim may be selected via the chassis measurement on an automated or computer-controlled basis using one or more evaluation criteria so that the method is automated and user intervention may be eliminated.

In an advantageous refinement of the method, the chassis measuring device evaluates the at least one ascertained geometric detail in the image of the wheel rim and this evaluation is also able to be displayed on the display device. In this way, a conclusion about the geometric detail ascertained and thus about the presumed quality of the results of the determination of the spatial position of a wheel rim relative to a measuring instrument may be made already while the method is being performed.

The geometric detail most suitable for determining the spatial position of a wheel rim relative to a measuring instrument is a torus, in particular the torus of a rim flange.

If the parameters of the selected or ascertained geometric detail are stored, they may be used for all the following measurements for locating the geometric detail.

Example embodiments of the present invention also includes a method for determining the spatial position of a wheel rim relative to a measuring instrument which has at least one camera, the wheel rim being in the field of view of the camera. First a model is provided, describing a model body of a locatable geometric detail of the wheel rim and the spatial position of the model body relative to the measuring instrument using model parameters. An image of the wheel rim geometric detail of the wheel rim is then detected with the camera and a method for locating a geometric detail for determining the spatial position of a wheel rim relative to a measuring instrument of the type described above is performed.

The image of the model body resulting from the model parameters is subsequently adapted or fitted to the image of the geometric detail of the wheel rim by varying model parameters of the model and tracking the changes in the model parameters of the model during the fitting, the data with regard to the position of the model body of the geometric detail of the wheel rim reflecting the spatial position of the geometric detail of the wheel rim and thus the wheel rim itself when the image of the model body of the geometric detail of the wheel rim resulting from the model parameters corresponds to the recorded image of the geometric detail of the wheel rim within predefined tolerance limits.

Through this method, the actual details in the chassis measurement, i.e., of the actual wheel rim, are taken into account to accurately determine the plane of the wheel spanned by the rim flange. Systematic errors in traditional methods may thus be avoided, and by giving preference to the method according to example embodiments of the present invention for locating a geometric detail for determining the spatial position of a wheel rim relative to a measuring instrument, it is possible to ensure that exactly one optimally suited geometric detail is selected, which improves the results of the position determination.

An example embodiment of the method according to the present invention is characterized in that the model body is a so-called osculating torus or a 3D CAD display. If the osculating torus represents the simplest form of a 3D model for the wheel rim contour, a 3D CAD display of the particular rim may also be used, thereby also achieving good results.

An example embodiment of the method according to the present invention is characterized in that in the case of the osculating torus, model parameters of the model include a main radius R and a secondary radius r of the torus, a position c of the center of the torus, a normal vector n of the plane of rotation of the torus and a position z of the projection center of a pinhole camera with which the osculating torus is observed. Of these model parameters of the osculating torus, some are known from the actual dimensions of the wheel rim and from the arrangement of the pinhole camera, so that the number of unknowns in the resulting optimization problem is advantageously reduced, thereby facilitating the fitting of the image of the osculating torus to the image of the actual rim.

An example embodiment of the method according to the present invention is characterized in that the geometric detail of the wheel rim is the wheel rim contour. Although other geometric details of the wheel rims may be considered as the basis for determining the spatial position of a wheel rim, the rim edge contour is a preferred feature because a sufficiently good contrast between the wheel rim and the tire is to be expected there.

An example embodiment of the method according to the present invention is characterized in that the wheel rim contour is detected with two cameras, which are aimed at the wheel at different angles. As will be shown below, one camera would be sufficient in principle as the basis for performing the measurements according to the present invention. However, two cameras are advantageous with respect to error correction to achieve a greater degree of accuracy in the measurements.

An example embodiment of the method according to the present invention is characterized in that the image of the wheel rim is recorded for determining a rotational angle reference point on the rim and for segmentation of the contour of the rim flange along the circumference of the rim. To ascertain the contour, the local illumination method and the local rim flange geometry may thus be taken into account with sufficient accuracy.

An example embodiment of the method according to the present invention is characterized in that the position of the valve is used to determine the rotational angle reference point on the rim. The valve is the most noticeable feature of an automotive wheel indicating the rotational position of the wheel. A marker could also be used to mark a rotational angle determination point on the rim, but this would again require contact with the wheel. In practice, it has been found that locating the valve is sufficient for the purposes of the present measurement.

In agreement with the method for locating a geometric detail of at least one wheel rim for determining its spatial position relative to a measuring instrument of the type described above, here again in the case when multiple markers are ascertained, the most suitable of them, e.g., the valve, is selected, or in the case when no marker at all is found initially, a partial area of the image of the wheel rim may be selected, a suitable marker then being able to be ascertained in this partial area or on the basis thereof in a subsequent step. This may also be done in a user-controlled or computer-controlled manner on the basis of predefinable criteria.

An example embodiment of the method according to the present invention is characterized in that presegmentation and fine segmentation (subpixel segmentation) are performed for the segmentation of the rim circumference. This procedure advantageously makes it possible to simplify the required computation operations to allow segmentation to be performed with sufficient accuracy.

An example embodiment of the method according to the present invention is characterized in that the data regarding the model parameters of the model which define the spatial position of the wheel rim are output or displayed when the image of the model body of the geometric detail of the wheel rim matches the recorded image of the geometric detail of the wheel rim.

An example embodiment of the method according to the present invention is characterized by the following steps: starting image reporting; segmenting the rim, in which the valve of the automotive wheel is also segmented; segmenting the rim edge; checking the segmentation results for a result that is present and unambiguous and, if necessary, selecting the most suitable result and, if necessary, selecting a partial area of an image of the rim for subsequent segmentation; reconstructing the 3D position of the valve, taking into account the external camera parameters; reconstructing the position of the rim edge; displaying the calculation result, namely the normal vector of the plane of the rim edge and/or storing same for further calculation.

An example embodiment of the method according to the present invention is characterized in that after starting image recording, a check is first performed to determine whether the illumination is sufficient for the measurement and then the illumination is readjusted accordingly.

An example embodiment of the method according to the present invention is characterized in that the readjustment includes greater or lesser brightness of the light for the illumination.

The measuring instrument according to example embodiments of the present invention for determining the spatial position of a wheel rim relative to the measuring instrument, which includes at least one camera, the wheel rim being in the field of view of the camera, is characterized by a computer that is programmed to perform one of the methods described above.

An example embodiment of the measuring instrument according to the present invention is characterized in that two cameras are provided in the measuring instrument described above, these cameras detecting the wheel rim contour and being aimed at the wheel at different angles.

An example embodiment of the measuring instrument according to the present invention is characterized in that it includes an optical sensor, a lens, an aperture setting device and a focus setting device for each camera, and the installed position of the sensor and the lens, the aperture setting and the focus setting being preadjusted.

An example embodiment of the measuring instrument according to the present invention is characterized in that the set focal distance is preadjusted in the case of zoom lenses.

An example embodiment of the measuring instrument according to the present invention is characterized in that an output/display device for outputting or displaying the data regarding the model parameters of the model which define the spatial position of the wheel rim when the image of the model body of the geometric detail of the wheel rim matches the detected image of the geometric detail of the wheel rim is/are provided. It is therefore easier to set up the test stand since the precision adjustment of the reference system may be performed anew at any time.

The advantages of the measuring instrument and its exemplary embodiments correspond substantially to the advantage of the method and its exemplary embodiments as described above.

The method according to example embodiments of the present invention for chassis measurement on motor vehicles is characterized in that one of the aforementioned methods for determining the spatial position of a wheel rim relative to a measuring instrument is performed on the wheels of the motor vehicle, in that the relative positions of the measuring instruments for performing the measurements are determined, in that the measurement results of the measurements on the wheels of the motor vehicle are converted into wheel position values, taking into account the relative positions of the measuring instruments and in that the wheel position values are output or displayed.

An example embodiment of the method according to the present invention is characterized in that the relative positions of the measuring instruments for performing the measurements are defined by adjustable mounting of the measuring instruments on a test stand.

An example embodiment of the method according to the present invention is characterized in that the relative positions of the measuring instruments for performing the measurements are determined by a reference system, which is provided on the measuring instruments.

An example embodiment of the method according to the present invention is characterized by the following steps: performing the measurements of the individual measuring instruments; entering the measurement results into a computer; calculating the transformation matrix from the results of the reference system measurement; transforming the results of the measuring instruments parallel to the axes of the computer coordinate system; converting the vectors into the coordinate system of the computer via offset angles and distances in the reference measurement system; determining the wheel position values in the computer coordinate system by analyzing the position of the result vectors relative to one another for calculating the corresponding chassis measured values; transferring the results pertaining to the wheel position angle values to a display device and/or storing same for further use.

The advantages of the method for the chassis measurement on motor vehicles and the advantageous embodiments are due to the fact that the measuring instruments described above and the corresponding methods may be used advantageously for accurate measurement of the entire chassis on motor vehicles.

A chassis measuring device according to example embodiments of the present invention and an automotive test track according to example embodiments of the present invention are characterized by measuring instruments for determining the spatial position of a wheel rim relative to a measuring instrument on the wheels of the motor vehicle, which are positioned on a test stand in such a way that one measuring instrument is assigned respectively to one of the wheels of the motor vehicle, the relative positions of the measuring instruments being determined in performing the measurements, by a computer which converts the measurement results of the measurements on the wheels of the motor vehicle into wheel position values, taking into account the relative positions of the measuring instruments, and by a display/output device which outputs or displays the wheel position values.

An automotive test track includes a chassis tester and a brake test stand and normally also a track plate, which may advantageously be omitted, however, with the automotive test track according to the present invention. In testing organizations, the automotive test track is often expanded by adding a joint clearance tester, which is in turn integrated into a pit or a lifting platform. In many cases, the automotive test track is also expanded by an exhaust gas tester and by a headlight adjustment device.

An example embodiment of the chassis measuring device or test track according to the present invention is characterized in that the relative positions of the measuring instruments for performing the measurements are defined by an adjustable assembly of the measuring instruments on one test stand.

An example embodiment of the chassis measuring device or test track according to the present invention is characterized in that the relative positions of the measuring instruments for performing the measurements are determined by a reference system, which is provided on the measuring instruments.

An example embodiment of the chassis measuring device or test track according to the present invention is characterized in that when two cameras are combined in one measuring instrument to form a stereo measurement system, the cameras are calibrated based on the coordinate system of the measuring instrument.

The advantages of the chassis measuring device or test track for motor vehicles correspond to those described in conjunction with the method for chassis measurement on motor vehicles.

The present invention is explained in greater detail below on the basis of exemplary embodiments with reference to the accompanying figures.

DETAILED DESCRIPTION

Figure 1:
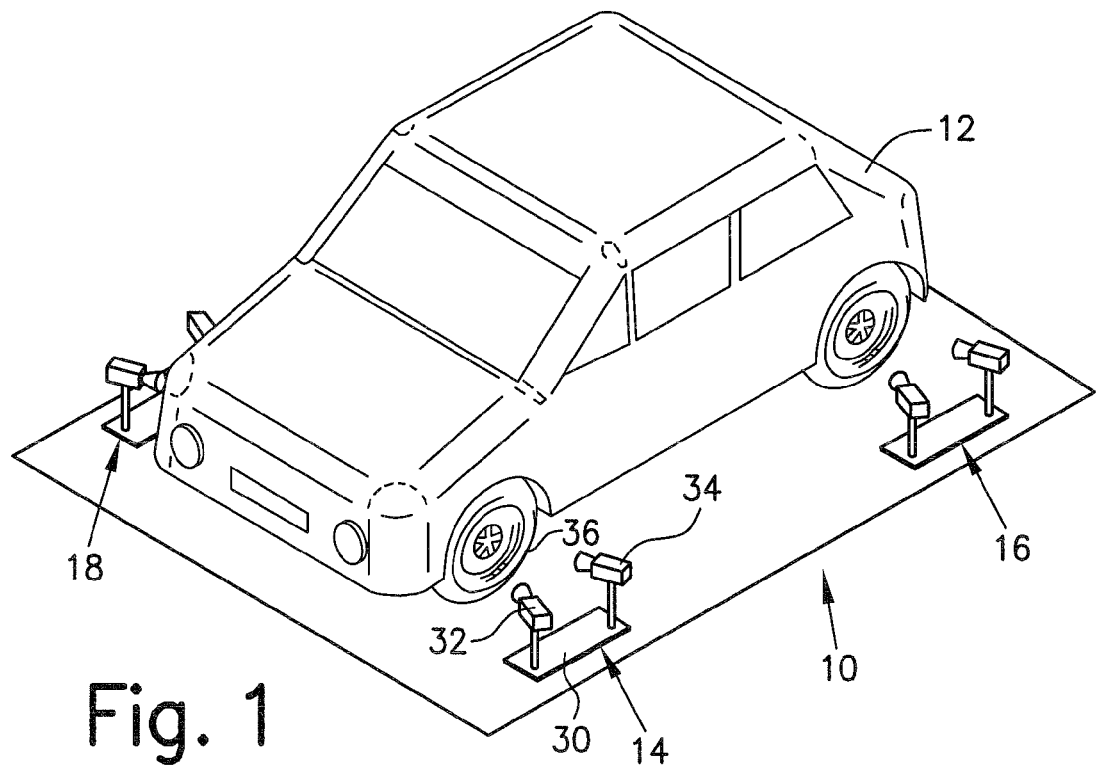
FIG. 1 shows a schematic diagram of a chassis measuring device having stationary measuring instruments and a motor vehicle standing between them.

FIG. 1 shows a test stand 10 and a motor vehicle 12 whose chassis is to be measured on the test stand. Four measuring instruments are arranged in stationary positions on test stand 10, three measuring instruments 14, 16, 18 of these being shown here, while the fourth measuring instrument is concealed by motor vehicle 12.

Measuring instruments 14, 16, 18 each include a base plate 30 and two cameras 32, 34 aimed at different angles at particular wheel 36 of motor vehicle 12. In the exemplary embodiment in FIG. 1, measuring instruments 14, 16, 18 are fixedly mounted on test stand 10, the angular positions of the measuring instruments relative to one another and their distances during assembly being defined and then remaining unchanged.

Figure 2:
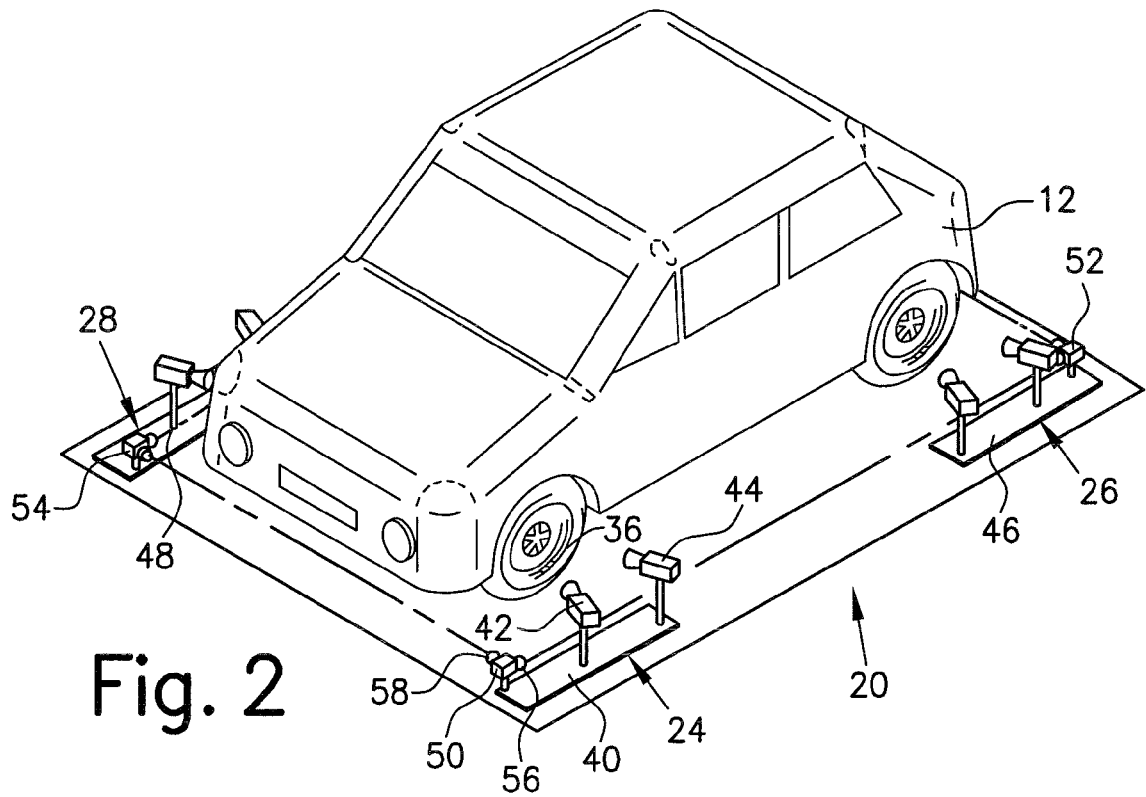
FIG. 2 shows a schematic diagram of a chassis measuring device having stationary measuring instruments and having a reference system for the measuring instruments relative to one another as well as a motor vehicle standing between them.

FIG. 2 shows a test stand 20 with motor vehicle 12, again showing three measuring instruments 24, 26, 28, while the fourth measuring instrument is concealed by motor vehicle 12.

In the exemplary embodiment in FIG. 2, measuring instruments 24, 26, 28 again have a base plate 40 and two cameras 42, 44, which are aimed at a particular wheel 36 at different angles. Reference system measuring heads 50, 52, 54 are provided on base plates 40, 46, 48 of measuring instruments 24, 26, 28 and allow optical measurement of the relative angular positions and distances of measuring instruments 24, 26, 28 (and of the measuring instrument concealed by motor vehicle 12). Each reference system measuring head, e.g., reference system measuring head 50, therefore has two transmit/receive units 56, 58, which are aimed at reference system measuring head 52 on the opposite side in the longitudinal direction of vehicle 12 or at reference system measuring head 54 on the opposite side across vehicle 12. Using such a reference system, an approximate adjustment of measuring instruments 24, 26, 28 is sufficient, and an accurate determination of the positions and distances of measuring instruments 24, 26, 28 relative to one another may be measured continuously and also readjusted.

Calibration of the stereo measurement system includes calibration of the "internal camera parameters" and calibration of the installation situation of measuring instruments 24, 26, 28. "Internal parameters" refer to all parameters that are camera-specific, i.e., defined by the camera setup. Internal parameters are defined by the installation position of the optical sensor, the lens, and its installation position, the aperture setting and the focus setting. In the case of zoom lenses, the set focal distance is also decisive. The internal parameters may be regarded as constant as long as no mechanical change is made in the camera or no change is made in the lens setting. The parameters are determined with the help of objects that are completely known. The calibration is preferably using a 3D object, e.g., an arrangement of planar tangents in various spatial positions that is provided with a sufficiently large number of noticeable points.

For the sake of completeness, it should be pointed out that calibration of the installation situation when two cameras are combined in one measuring instrument to form a stereo measurement system must be performed based on the coordinate system of the measuring instrument. To do so, corresponding axle shafts, supporting surfaces and/or index pins are provided on the measuring instrument, so that the installed reference measurement system and the stereo measurement system are both able to be calibrated with respect thereto. Alternatively, an optical calibration may be performed.

The quality of the illumination is checked on the basis of the available measurement images. They are checked for whether there is adequate segmentability, i.e., for the quality of the shadow border contrast. If the segmentability is inadequate, the illumination is readjusted.

Except for the distance measurement, the measurement of the reference system data is identical to the method with the chassis measuring systems known per se. Results of measurement of the reference system include the position of individual measuring instruments relative to one another, including distance, and the position of individual measuring instruments relative to the vertical. The distance measurement is performed via the angle measurement of two light emitting diodes (LEDs) with known spacing.

Figure 3:
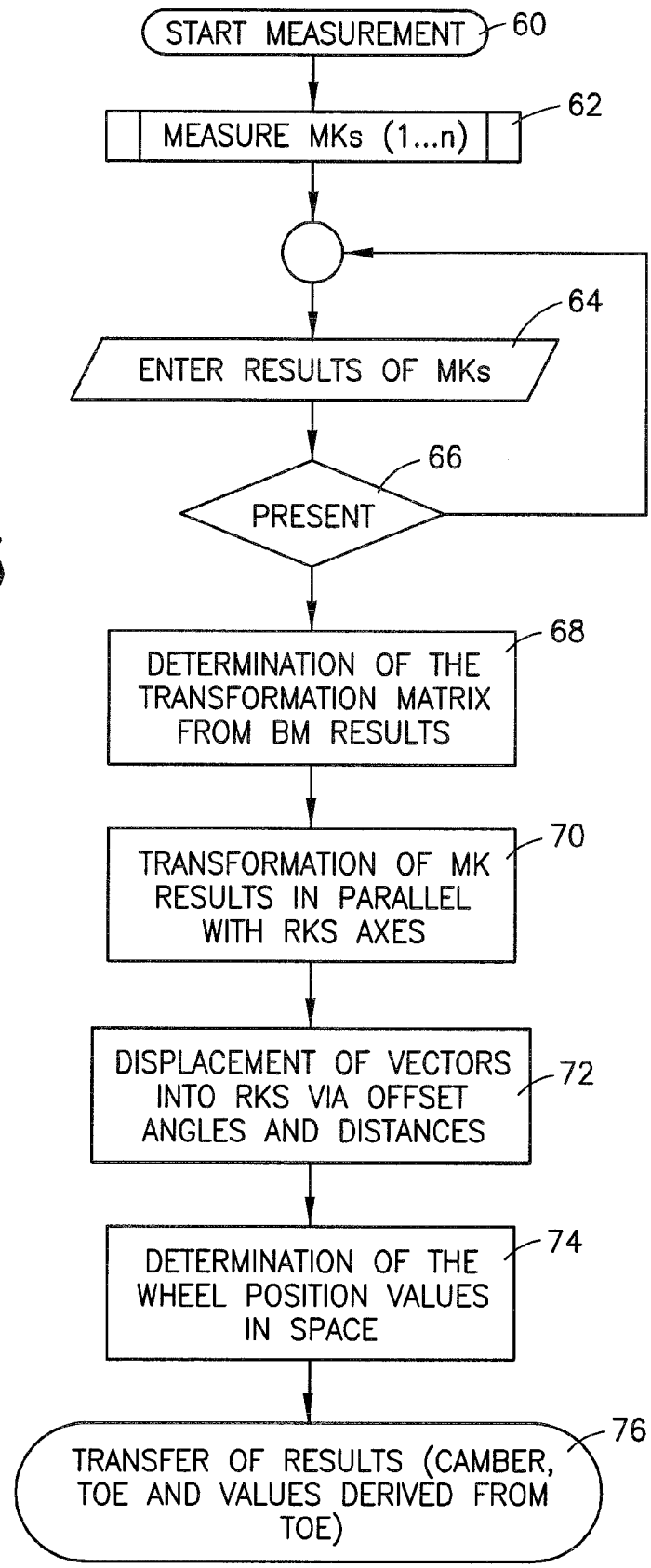
FIG. 3 shows a flow chart for the method according to an example embodiment of the present invention for determining the spatial position of a wheel rim relative to a measuring instrument.

FIG. 3 shows a schematic flow chart for determining the spatial position of a wheel rim relative to a measuring instrument. It is assumed here that the aforementioned measurements of the reference system and calibration of the measuring instruments are concluded.

The measurement is started in step 60. The measurements of individual measuring instruments 14, 16, 18 or 24, 26, 28 are performed in step 62, and the measurement results are input into a computer (not shown) in steps 64, 66. In step 68 the computer determines the transformation matrix from the results of the reference system measurement (BM results), i.e., from the results of the reference system measurement. In step 70 the results of the measuring instruments (MK) are transformed parallel to the axes of the computer coordinate system (RKS axes), a coordinate system of the measuring instruments being arbitrarily defined as the computer coordinate system. In step 72 the vectors are then shifted, i.e., converted, into the coordinate system of the computer via the offset angles and distances, with the individual transformed result vectors of the stereo measurement being shifted to a common computer coordinate system. In step 74 the computer determines the wheel position values in space, i.e., in particular the individual toe angles of the front wheels, the total toe angle of the front wheels, the so-called geometric travel axis and the like, as is customary with traditional chassis measuring devices. The position of the result vectors relative to one another is analyzed in the computer coordinate system, and the corresponding chassis measured values are calculated from these results. Finally, in step 76 the results for the wheel position values, namely the camber, toe and angle values derived from the toe are transferred to a display device and/or stored for further use.

Figure 4:
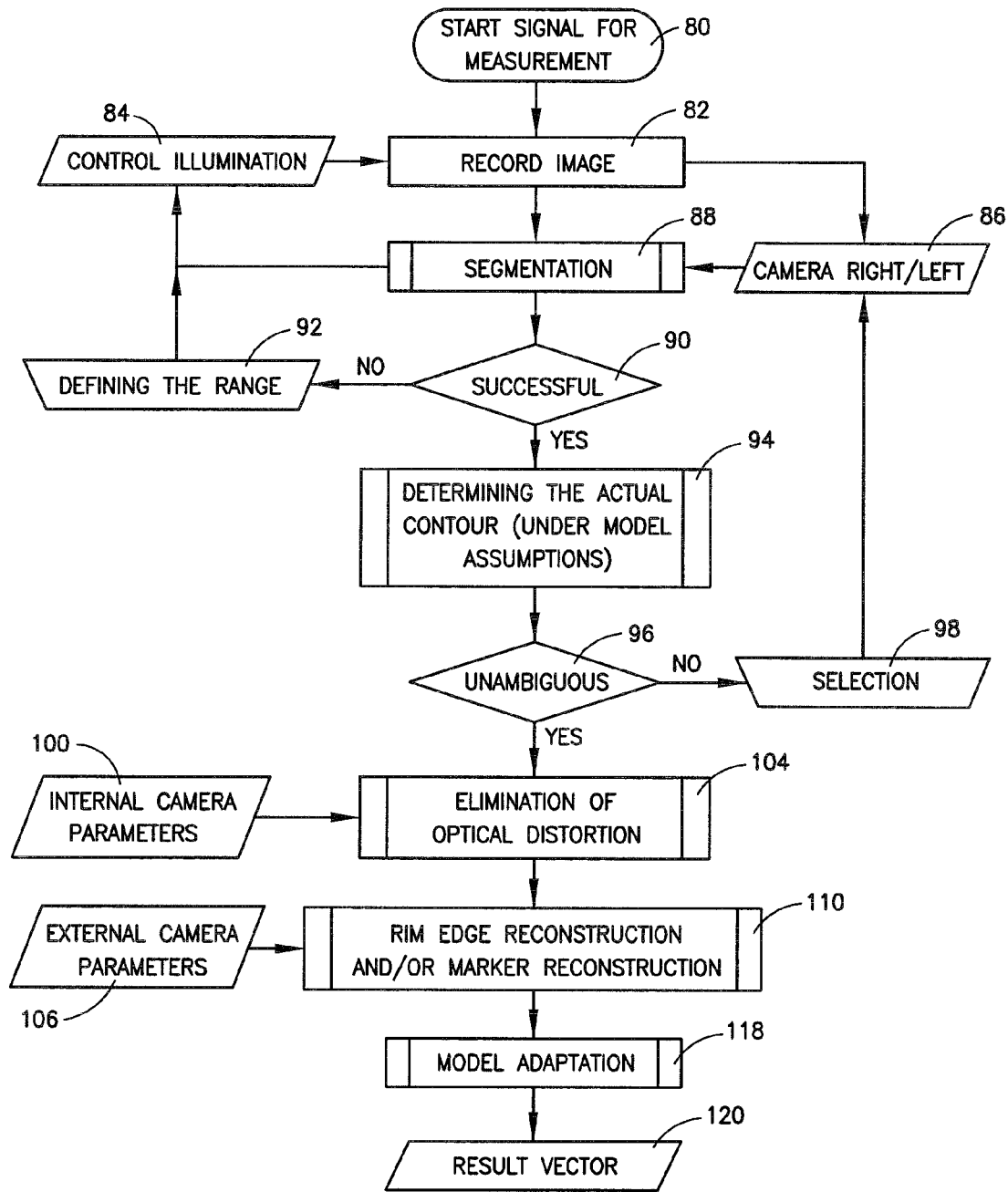
FIG. 4 shows a detailed flow chart of the method according to an example embodiment of the present invention for determining the spatial position of a wheel rim relative to a measuring instrument.

FIG. 4 shows a flow chart for determining the spatial position of a wheel rim relative to a measuring instrument in a measuring instrument in somewhat greater detail.

In step 80, a start signal for the measurement is given. The image recording is then started in step 82, and at least one image of wheel rim 36 is recorded, whereupon a check is performed first in step 84 to determine whether the illumination is sufficient for the measurement and the illumination is readjusted, if necessary. The readjustment may include greater or lesser brightness of the light for the illumination, the goal being to obtain the greatest possible contrast for the part of the rim and/or the rim flange observed by the cameras. The cameras positioned on the right and left with respect to the wheel axis are active (step 86) and their function is to check on the illumination situation as well as to record stereo images of wheel rim 36 after adjustment of the illumination is concluded.

Segmentation of the rims is performed in step 88. Taking into account model assumptions, point-shaped or dash-shaped geometric details, e.g., the valve and its angular position, or toroidal, round or ellipsoidal geometric details, e.g., the rim edge or rim flange, may be defined. Segmentation may be subdivided into presegmentation, fine segmentation and subpixel segmentation, and it is performed to measure certain angle ranges of the rim edge and be able to take into account the measured values in ascertaining the plane of the rim edge.

After segmentation, a check is performed in step 90 to find whether the segmentation has supplied usable results, i.e., whether at least one usable geometric detail has been ascertained.

If this is not the case, an area in the image of the camera is defined or selected in step 92, a renewed segmentation then being performed in step 88 in or on the basis of this area to ascertain a usable geometric detail.

If the check in step 90 reveals that at least one usable geometric detail has been ascertained, the real contour of the ascertained geometric detail(s) is determined under model assumptions in step 94.

In step 96, a check is performed to determine whether the result is unambiguous, i.e., whether there is exactly one or more geometric detail contours. If multiple geometric detail contours have been ascertained, exactly one of these geometric detail contours is selected and the sequence is continued with step 86. If exactly one geometric detail contour has been ascertained, the sequence is continued with step 104.

In step 104, optical distortion with respect to the images of the wheel rim is eliminated. In step 100 the measurement results so far are converted, taking into account the internal camera parameters.

For reconstruction of the rim edge (step 110), the external camera parameters are taken into account (step 106). A first approximation of the plane of the rim edge is then performed and the angle argument is calculated. Model fitting and/or the final determination of the plane of the rim edge is/are performed in step 118. In step 120, the result of the calculation, namely the normal vector and the center point of the plane of the rim edge are displayed and/or stored for further calculation. The results thereby obtained are then processed further for calculation of the wheel setting angle values, as described with reference to FIG. 3 in steps 68 to 76.

Figure 5:
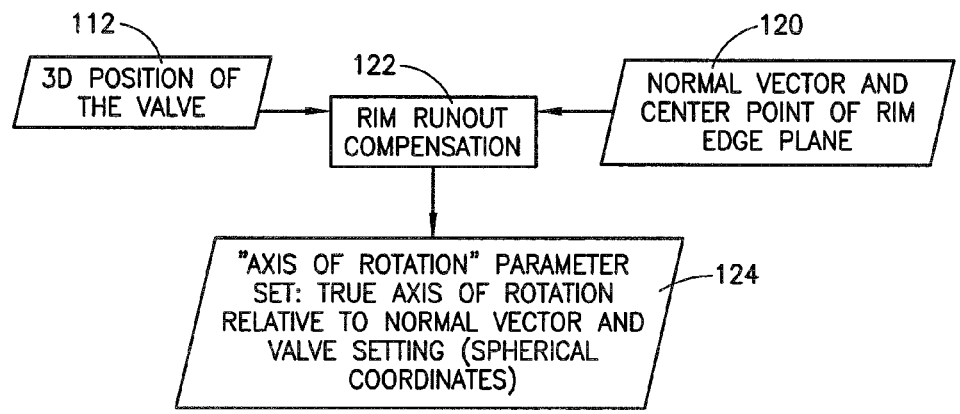
FIG. 5 shows a flow chart for the wheel rim runout compensation.

FIG. 5 shows a schematic flow chart for wheel rim runout compensation. For wheel rim runout compensation in step 122, the results obtained previously in step 120 (FIG. 4) regarding the 3D position of the valve and/or the normal vector and the center point of the plane of the rim edge are taken into account to obtain an "axis of rotation" parameter set, i.e., the true axis of rotation with respect to the normal vector and the valve setting in spherical coordinates. Measurement of wheel rotation is required when performing and monitoring rim runout compensation, in determining the steering angle inclination as part of a wheel lock angle measurement and in determining the change in caster angle when adjusting the caster angle. A lower measurement accuracy is required for performing and monitoring rim runout compensation. Resolution of wheel rotation to approximately 10 angle minutes is sufficient. Furthermore, any rotation of the wheel should be detectable, so tracking and measurement of the valve are sufficient. The valve is uniquely positioned on the circumference and may be located with corresponding accuracy.

To determine the steering angle inclination as part of a wheel lock measurement and to determine the change in caster angle when adjusting the caster angle, wheel rotation is to be determined with an accuracy of at least 2 angle minutes. However, arbitrary rotation of the wheel need not be measurable. To do so, the 3D position of the valve may be determined. Alternatively, non-rotationally symmetrical edges and/or structures in the rim may be measured and tracked, using algorithms corresponding to those used for determining the rim edge.

Figure 6:
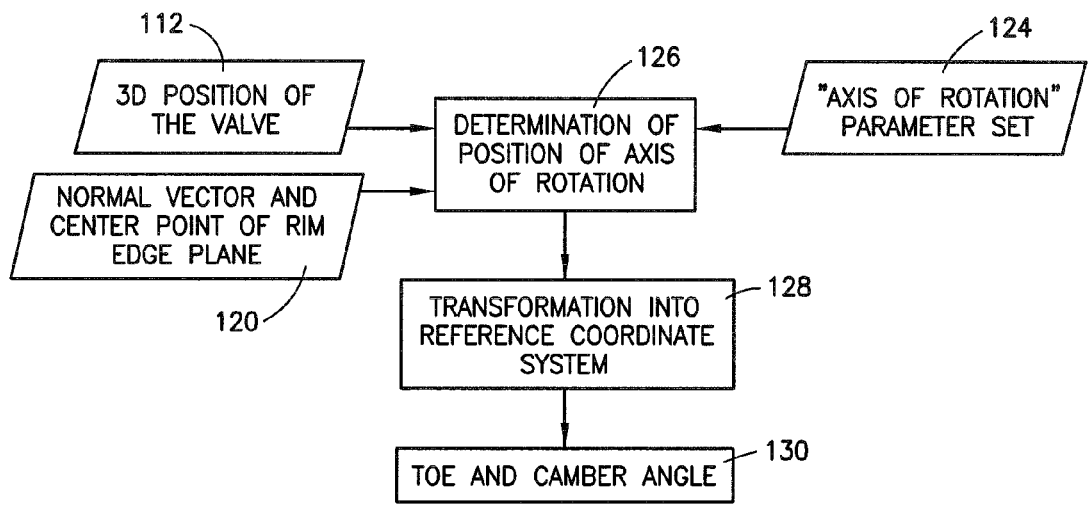
FIG. 6 shows a flow chart for the determination of the instantaneous toe angle and camber angle of the wheel.

FIG. 6 shows a schematic flow chart for calculation of the toe angle and camber angle from the results of step 120 of FIG. 4 and step 124 of FIG. 5. In other words, information about the 3D position of the valve and information about the normal vector and the center point of the plane of the rim edge as well as the "axis of rotation" parameter set in step 126 is used to determine the position of the axis of rotation. The result of step 126 is transformed in step 128 into the reference coordinate system of the computer, which then calculates the toe angle and camber angle in step 130.

For those skilled in the art, the calculation principles for calculation of the chassis parameters are familiar from DE 10 2004 013 441 and need not be described in further detail here.

Figure 7:
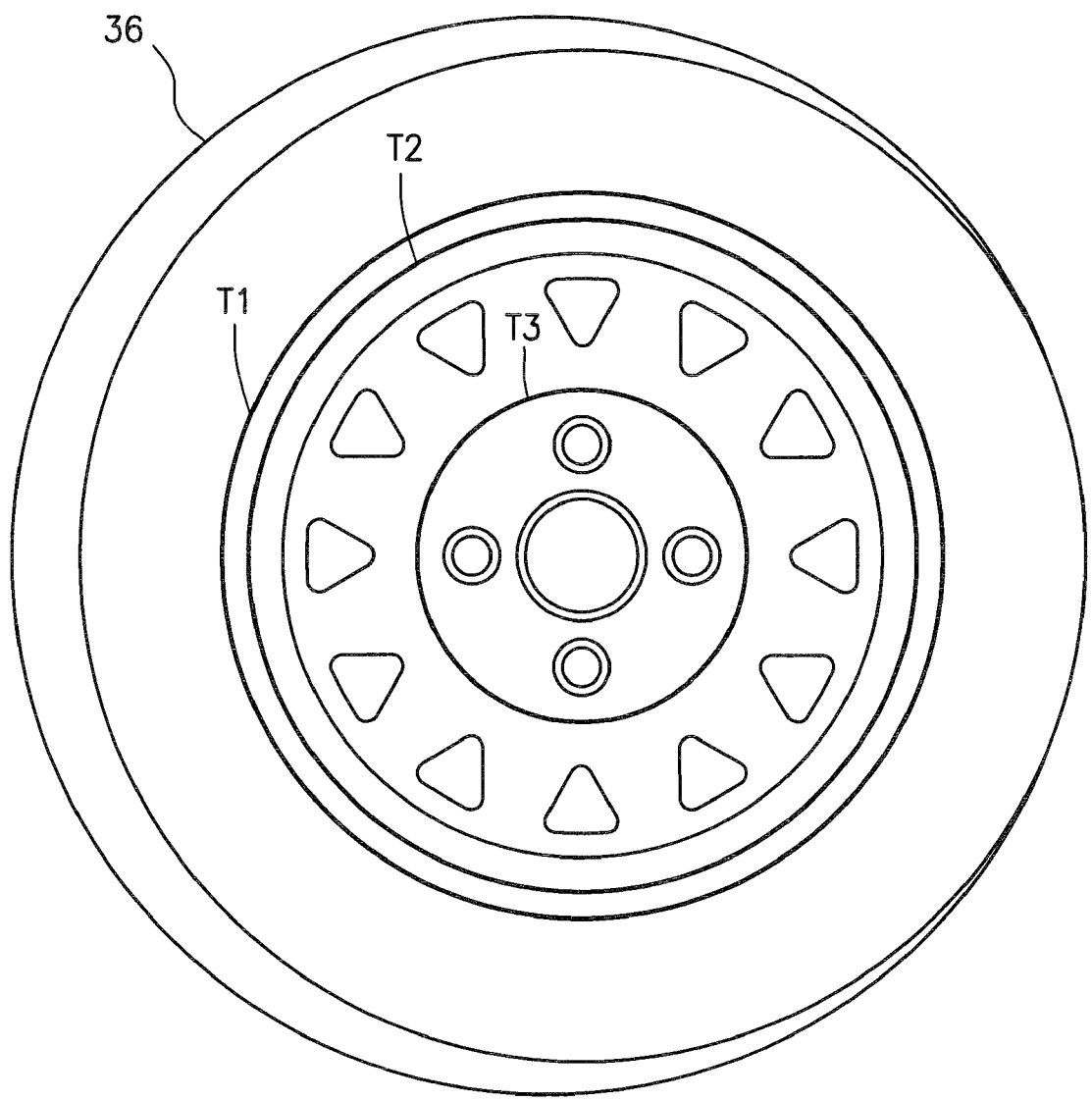
FIG. 7 shows a camera image of a side view of the motor vehicle wheel from FIG. 1 showing three toruses detected therein.

The exemplary embodiment shown in FIG. 7 relates to the method variant in which multiple geometric details of the wheel rim are found by the chassis measuring device, and the most suitable geometric detail thereof is selected (step 96).

Figure 8:
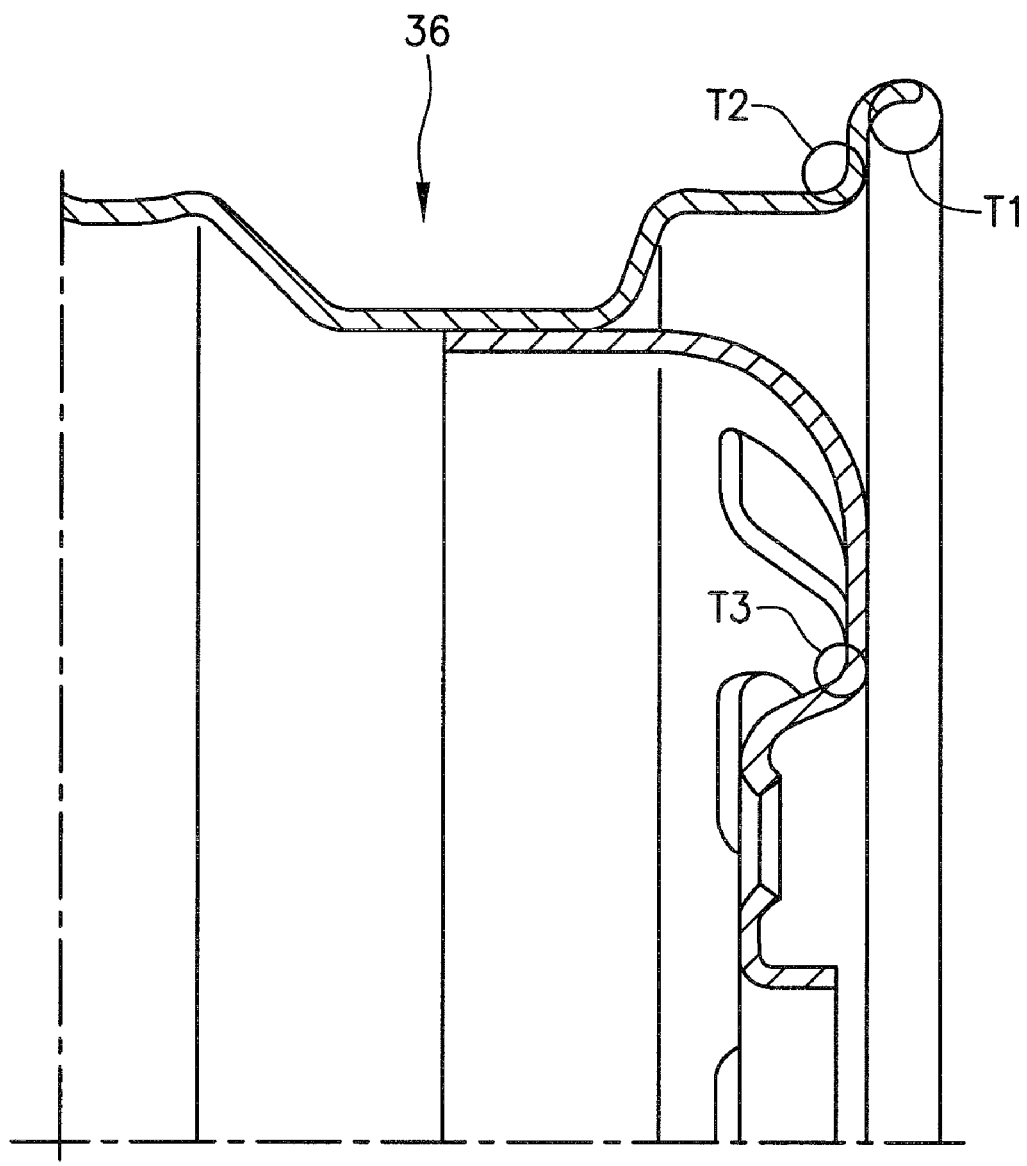
FIG. 8 shows a schematic sectional diagram of the motor vehicle wheel from FIG. 1.

FIG. 7 shows the camera image of the side view of front left wheel rim 36, which has been recorded using measuring camera 42 of measuring instrument 24 in step 82 of the method according to FIG. 4. This camera image as well as the following camera images are shown on a display screen, for example. FIG. 8 shows a schematic sectional diagram of motor vehicle wheel 36.

Three toruses that were ascertained by segmentation in step 88 according to the method of FIG. 4, namely rim flange torus T1, another torus T2 having a slightly smaller diameter and a much smaller torus T3 are discernible on wheel rim 36. Therefore, checking step 90 yields a positive result and the actual contours of these three toruses T1, T2 and T3 are determined in step 94.

However, checking step 96 yields a negative result because it is not clear which of three toruses T1, T2 and T3 is now the most suitable for determining the spatial position of wheel rim 36 relative to measuring instrument 24.

Substantially all three toruses T1, T2 and T3 are suitable for the method according to example embodiments of the present invention for determining the spatial position of a wheel rim relative to a measuring instrument, but wheel rim flange torus T1 is preferred because the spatial position of wheel rim 36 relative to measuring instrument 24 is then determinable with the greatest accuracy.

Accordingly, in the case when the chassis measuring device ascertains multiple toruses, namely in this case toruses T1, T2 and T3, the one that is most suitable for further processing is to be selected for the further method.

Thus in step 98, rim flange torus T1 is selected for the further method by a user or by a computer (not shown) and after again running through method steps 86, 88, 90, 94 and 96, the spatial position of wheel rim 36 relative to measuring instrument 24 is now determined by following method steps 100, 104, 106, 110, 118, 120.

Figure 9:
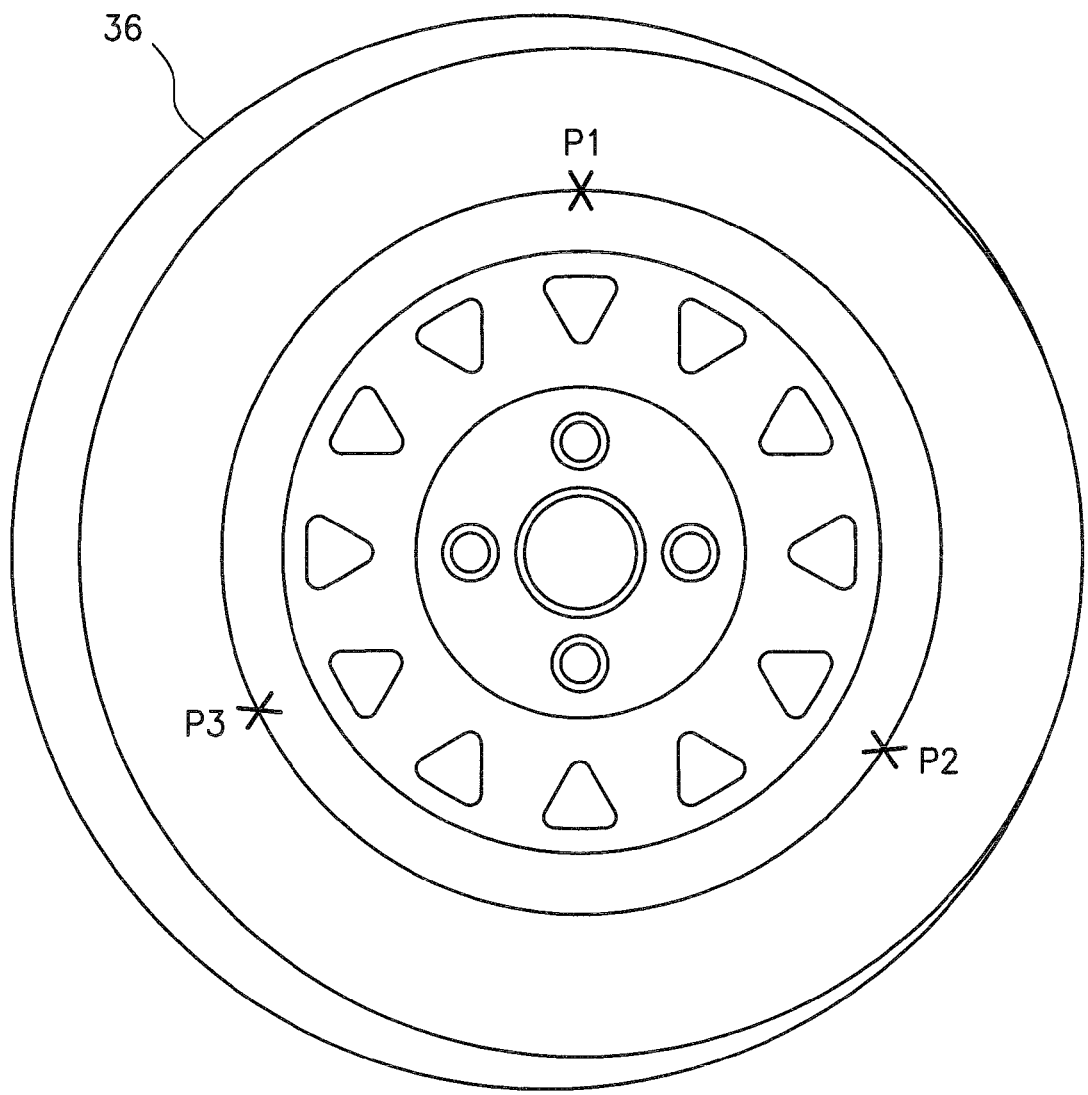
FIG. 9 shows a camera image of a side view of the motor vehicle wheel from FIG. 1 having three equidistant points marked therein.
Figure 10:
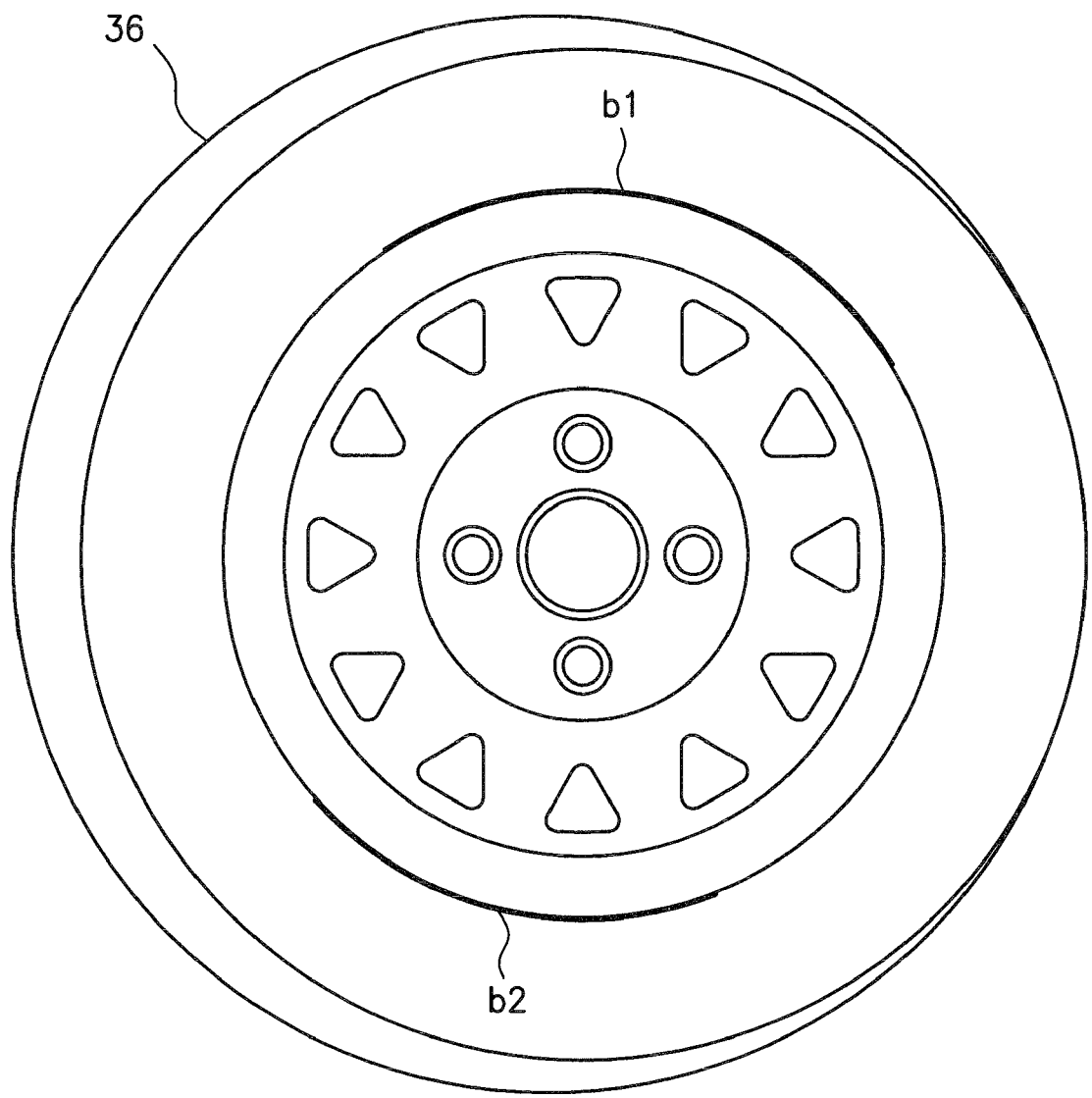
FIG. 10 shows a camera image of a side view of the motor vehicle wheel from FIG. 1 having two arcs and one rim flange torus recognized therein.
Figure 11:
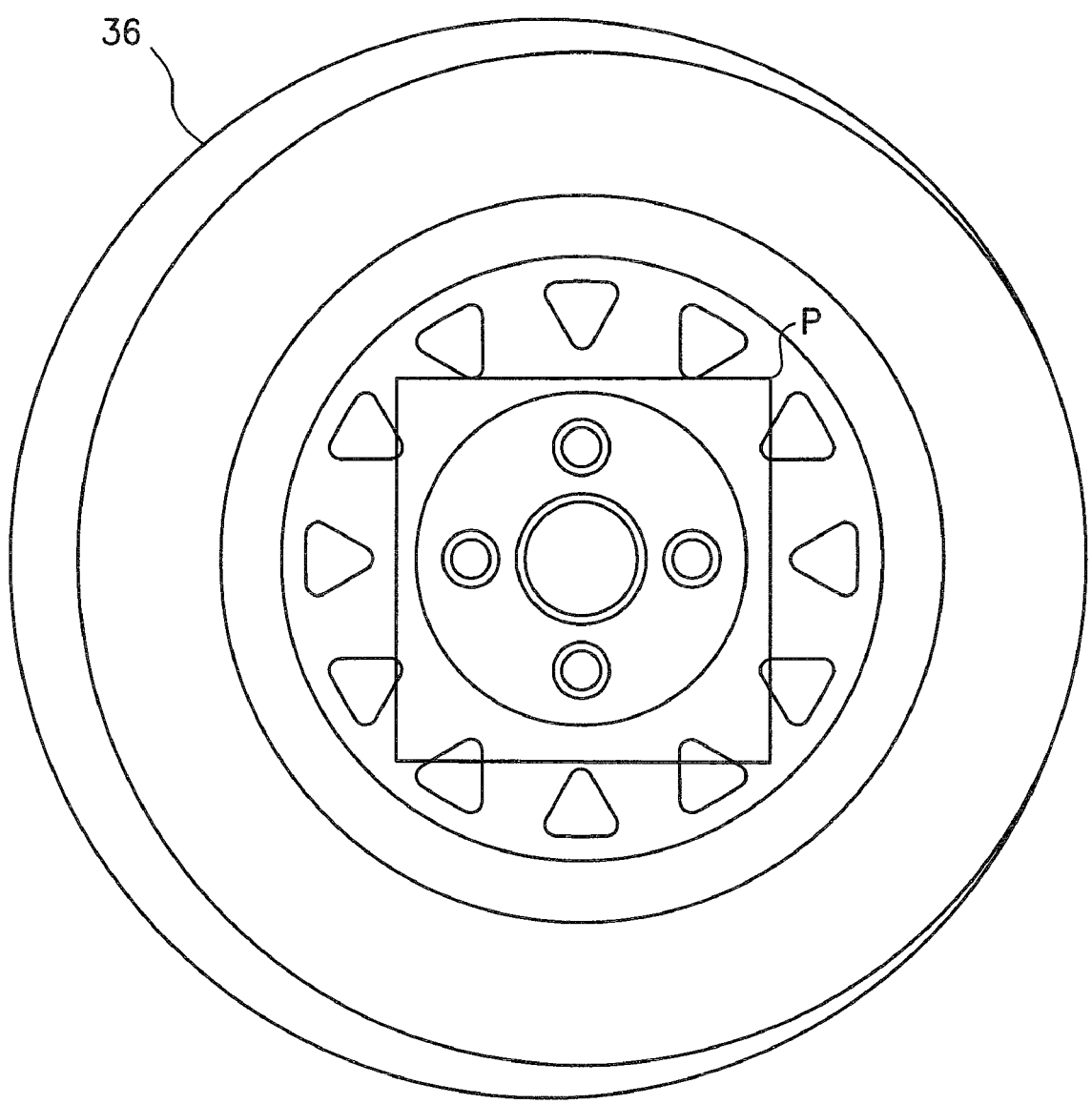
FIG. 11 shows a camera image of a side view of the motor vehicle wheel from FIG. 1 having one rectangle marked therein.

The exemplary embodiments according to FIGS. 9, 10, and 11 relate to the method variants in which no suitable geometric detail of the rim is initially detected in step 90 and in which the chassis measuring device is provided with assistance by selection of a partial area (step 92), so that it is able to ascertain a suitable geometric detail and use it for the further method.

FIG. 9 shows a camera image of a side view of motor vehicle wheel 36 having three equidistant points P1, P2 and P3 marked in it.

Points P1, P2 and P3 are equidistant on rim flange torus T1.

In the exemplary embodiment in FIG. 9, the chassis measuring device has not been able to ascertain a geometric detail of the rim, in particular no torus on wheel rim 36, e.g., due to poor visibility or contrast conditions in the segmentation according to step 88.

Therefore, three equidistant points P1, P2 and P3 on rim flange torus T1 are marked by a user in step 92, for example, and the chassis measuring device may then ascertain rim flange torus T1 on the basis of these three equidistant points P1, P2 and P3 in a renewed segmentation in step 88 and, based on that, perform the further method to determine the spatial position of the wheel rim relative to the measuring instrument, as shown in FIG. 4.

FIG. 10 shows a camera image of a side view of motor vehicle wheel 36 having two arc sections b1 and b2 of a rim flange torus T1 recognized therein.

Two arc segments b1 and b2 were recognized by the chassis measuring device but were not able to be combined to form a complete torus during segmentation in step 88 because the areas situated between arc segments b1 and b2 were not able to be recognized.

In this exemplary embodiment, arc segments b1 and b2 are identified as being situated on a common torus T1 by a user, for example, with the help of a keyboard or a mouse in step 92, so that the chassis measuring device is able to assemble or ascertain rim flange torus T1 in renewed segmentation in step 88 from arc segments b1 and b2 and may use this rim flange torus T1 as the basis for the further method for determining the spatial position of the wheel rim relative to the measuring instrument (steps 104, etc.).

FIG. 11 shows a camera image of a side view of motor vehicle wheel 36 having a rectangle R marked in it.

FIG. 11 illustrates the same case as FIG. 9, namely when the chassis measuring device has not been able to ascertain any geometric detail, in particular a torus on wheel rim 36 in segmentation in step 88, e.g., due to poor visibility or contrast conditions.

Therefore, a rectangle R is drawn around internal torus T3 (see FIG. 7) by a user in step 92 to indicate to the chassis measuring device that a geometric detail is situated in this area, so that the chassis measuring device is able to investigate the area of rectangle R of wheel rim 36 in greater detail during subsequent renewed segmentation in step 88 and is able to ascertain torus T3 and may use this torus T3 as a basis for the further method for determination of the spatial position of the wheel rim relative to the measuring instrument (steps 104, etc.).

LIST OF REFERENCE NUMERALS 10, 20 test stand
12 motor vehicle
14, 16, 18 measuring instruments
24, 26, 28 measuring instruments
32, 34, 42, 44 measuring cameras
36 wheel rims, wheels
30, 40, 46, 48 base plates
50, 52, 54 reference system measuring heads
56, 58 transmit/receive units
T1 rim flange torus
T2, T3 toruses
P1, P2, P3 equidistant points
b1, b2 arc segments
R rectangle

What is claimed is:

1. A method for locating a geometric detail of at least one wheel rim for determining its spatial position relative to a measuring instrument, comprising:

a) aiming at least one measuring camera of a measuring instrument of a chassis measuring device at a wheel rim;
b) detecting an image of a wheel rim by the at least one measuring camera;
c) ascertaining at least one geometric detail in the image of the wheel rim;
d) selecting a geometric detail that has been detected for determining the spatial position of the wheel rim relative to the measuring instrument.

2. The method according to claim 1, wherein in a) at least one measuring camera of a first measuring instrument is aimed at a first wheel rim and at least one measuring camera of a second measuring instrument is aimed at a second wheel rim; and
in b) at least one image of each wheel rim is detected by the measuring cameras.

3. The method according to claim 2, wherein in a) at least one measuring camera of a first measuring instrument is aimed at a first wheel rim, at least one measuring camera of a second measuring instrument is aimed at a second wheel rim; at least one measuring camera of a third measuring instrument is aimed at a third wheel rim, and at least one measuring camera of a fourth measuring instrument is aimed at a fourth wheel rim; and
in b) at least one image of each wheel rim is detected by the measuring cameras.

4. The method according to claim 2, wherein in c) at least one geometric detail is ascertained in the image of a wheel rim, and in d) an ascertained geometric detail is selected for determining the spatial position of the wheel rim relative to the measuring instrument.

5. The method according to claim 4, wherein after the selection of an ascertained geometric detail takes place, a check is performed to determine whether the geometric detail is also present in the measuring camera images of other measuring instruments.

6. The method according to claim 2, wherein in c) at least one geometric detail that occurs in all images of the wheel rims is ascertained, and
in d) an ascertained geometric detail is selected for determining the spatial position of the wheel rims relative to the measuring instruments.

7. A method for locating a geometric detail for determining a spatial position of a wheel rim relative to a measuring instrument, including:
a) aiming at least one measuring camera of the measuring instrument at a wheel rim;
b) detecting an image of a wheel rim by the at least one measuring camera;
c) selecting a partial area in the image of a wheel rim;
d) ascertaining at least one geometric detail on the basis of the selected partial area in the image of the wheel rim for determining its spatial position relative to the measuring instrument.

8. The method according to claim 7, wherein for selection of a partial area in the image of the wheel rim, at least one point is determined.

9. The method according to claim 7, wherein for selection of a partial area in the image of the wheel rim at least three points through which at least one of (a) a circular and (b) an ellipsoidal geometric detail passes are determined.

10. The method according to claim 9, wherein the at least three determined points are equidistant.

11. The method according to claim 7, wherein for selection of a partial area in the image of the wheel rim, at least one rectangular area around at least one of (a) a circular and (b) an ellipsoidal geometric detail is determined.

12. The method according to claim 7, wherein two stereo measuring cameras are aimed at a wheel rim at an angle.

13. The method according to claim 7, wherein at least one of (a) the image of the wheel rim and (b) the at least one ascertained geometric detail is displayed on a display device.

14. The method according to claim 7, wherein the selection of at least one of (a) an ascertained geometric detail and (b) a partial area in the image of the wheel rim is performed via at least one of (a) a display device and (b) an input device.

15. The method according to claim 7, wherein the selection of at least one of (a) an ascertained geometric detail and (b) a partial area in the image of the wheel rim is performed on the basis of at least one evaluation criterion.

16. The method according to claim 7, wherein the chassis measuring device evaluates the at least one ascertained geometric detail in the image of the wheel rim.

17. The method according to claim 16, wherein the evaluation of the at least one geometric detail is also displayed on a display device.

18. The method according to claim 7, wherein at least one geometric detail includes at least one of (a) a torus and (b) a rim flange torus.

19. The method according to claim 7, wherein parameters of the geometric detail are stored.

20. A method for determining a spatial position of a wheel rim relative to a measuring instrument having at least one camera, the wheel rim situated in a field of view of the camera, comprising:
   providing a model which describes a model body of a locatable geometric detail and the spatial position of the model body relative to the measuring instrument through model parameters,
   detecting an image of the wheel rim using the camera and locating a geometric detail of at least one wheel rim;
   fitting the image of the model body resulting from the model parameters to the image of the geometric detail by varying model parameters of the model, and tracking changes in the model parameters of the model during the adjustment;
   wherein the data reflecting the spatial position of the geometric detail and thus the wheel rim itself with respect to the position of the model body of the geometric detail when the image of the model body of the geometric detail resulting from the model parameters matches the detected image of the geometric detail within predefined tolerance limits.

21. A method for chassis measurement on motor vehicles, comprising:
   performing the method according to claim 20 on wheel rims of the motor vehicle;
   wherein the relative positions of the measuring instruments for performing the measurements are determined;
   wherein measurement results of the measurements on the wheels of the motor vehicle are converted into wheel position values, taking into account the relative positions of the measuring instruments, and
   wherein the wheel position values are at least one of (a) output and (b) displayed.

22. A chassis measuring device for motor vehicles, comprising
   at least two measuring instruments positioned on a test stand such that one measuring instrument is assigned respectively to one of the wheels of the motor vehicle, relative positions of the measuring instruments being determined when performing measurements;
   a computer adapted to convert the measurement results of the measurements on the wheels of the motor vehicle into wheel position values, taking into account the relative positions of the measuring instruments; and
   a display/output device adapted to at least one of (a) output and (b) display the wheel position values.

23. A test track for motor vehicles, comprising:
   at least two measuring instruments positioned such that one measuring instrument is assigned respectively to one of the wheels of the motor vehicle, relative positions of the measuring instruments being determined when performing the measurements,
   a computer adapted to convert the measurement results of the measurements on the wheels of the motor vehicle into wheel position values, taking into account the relative positions of the measuring instruments; and
   a display/output device adapted to at least one of (a) display and (b) output the wheel position values.

* * * * *